United States Patent
Radulescu

(10) Patent No.: US 7,839,897 B2
(45) Date of Patent: Nov. 23, 2010

(54) METHODS AND APPARATUS FOR UNIDIRECTIONAL TIMING MESSAGE TRANSPORT OVER PACKET NETWORKS

(75) Inventor: Codrut Radu Radulescu, Bethlehem, PA (US)

(73) Assignee: Agere Systems Inc., Allentown, PA (US)

(*) Notice: Subject to any disclaimer, the term of this patent is extended or adjusted under 35 U.S.C. 154(b) by 903 days.

(21) Appl. No.: 11/536,989

(22) Filed: Sep. 29, 2006

(65) Prior Publication Data

US 2008/0080567 A1   Apr. 3, 2008

(51) Int. Cl.
H04J 3/06 (2006.01)
(52) U.S. Cl. .................................. 370/503
(58) Field of Classification Search ............ 370/503
See application file for complete search history.

(56) References Cited

U.S. PATENT DOCUMENTS

| 5,533,021 | A  | * | 7/1996 | Branstad et al. ............ 370/396 |
| 6,757,303 | B1 | * | 6/2004 | Kikuchi et al. ............. 370/509 |
| 6,898,213 | B1 | * | 5/2005 | Shimelmitz et al. ......... 370/537 |
| 7,042,911 | B2 | * | 5/2006 | Toshitani .................... 370/503 |
| 7,103,124 | B1 | * | 9/2006 | Lindskog et al. ............ 375/354 |

FOREIGN PATENT DOCUMENTS

| EP | 1294116 | 3/2003 |
| EP | 1394975 | 3/2004 |
| WO | PCTUS07067900 | 6/2007 |

OTHER PUBLICATIONS

James Aweya et al., Clock recovery based on packet inter-arrival time averaging, Elsevier (Nov. 18, 2005).*
J. Aweya et al., "Clock Recovery Based on Packet Inter-Arrival Time Averaging," Computer Communications, 2006, pp. 1696-1709, vol. 29, No. 10.

* cited by examiner

*Primary Examiner*—Derrick W Ferris
*Assistant Examiner*—Mang Yeung
(74) *Attorney, Agent, or Firm*—Ryan, Mason & Lewis, LLP

(57) ABSTRACT

Methods and apparatus for synchronizing a first clock of a transmit node and a second clock of receive node in a packet network are provided. Consecutive intervals of time-stamped packets transferred from the transmit node to the receive node are selected. The consecutive intervals have a difference in delay noise within a defined acceptance window. A correction factor is determined for the second clock in accordance with transmit and receive time stamps of transferred time-stamped packets bounding the consecutive intervals. The correction factor is applied to the second clock to synchronize the second clock of the receive node with the first clock of the transmit node.

21 Claims, 3 Drawing Sheets

METHODS AND APPARATUS FOR UNIDIRECTIONAL TIMING MESSAGE TRANSPORT OVER PACKET NETWORKS

FIELD OF THE INVENTION

The present invention relates generally to packet transfer networks and, more particularly, to timing information transmission over packet networks.

BACKGROUND OF THE INVENTION

In order to synchronize clock sources on both ends of a packet transfer network, timing information is transmitted between a clock source of a transmit node and a clock source of a receive node. However, standard time synchronization protocols can be inaccurate and typically result in long synchronization times. Further, such protocols have very poor tolerance for the uncertain and varying delay of synchronization signals from the transmit node to the receive node of the packet transfer network, commonly known as packet delay variation (PDV).

One such example of an existing time synchronization protocol is the Standard Precision Time Protocol (PTP) IEEE 1588. IEEE 1588 utilizes two phases in a synchronization process. The first phase corrects the time difference between the clock sources, and is known as offset measurement. This phase is performed with synchronization messages sent from the transmit node to the receive node. The second phase actively measures the delay or latency between the clock sources with delay requests sent from the receive node to the transmit node, and delay responses sent from the transmit node to the receive node. Thus, IEEE 1588 teaches a bidirectional transmission of packets in the synchronization of clock sources. However, IEEE 1588 is not capable of tolerating PDV at high orders of magnitude. Further the bidirectional message transmittal is slower and less accurate in determining synchronization times.

Therefore, there is a need for a time synchronization protocol that has faster synchronization times for the clock sources of the transmit node and the receive node while also resulting in greater accuracy in synchronization. It is also desirable for such a time synchronization protocol to be tolerant of PDV at high orders of magnitude.

SUMMARY OF THE INVENTION

The present invention provides transmission of precision timing information from a clock source of a transmit node to a clock source of a receive node over packet network having a high variation of propagation delay.

In accordance with one aspect of the invention, a method of synchronizing a first clock of a transmit node and a second clock of receive node in a packet network is provided. Consecutive intervals of transferred time-stamped packets from the transmit node to the receive node are selected. The consecutive intervals have a difference in delay noise within a defined acceptance window. A correction factor is determined for the second clock in accordance with transmit and receive time stamps of transferred time-stamped packets bounding the consecutive intervals. The correction factor is applied to the second clock to synchronize the second clock of the receive node with the first clock of the transmit node.

In an illustrative embodiment, the steps of selecting consecutive intervals, determining a correction factor and applying the correction factor may be repeated for additional consecutive intervals. When a correction factor is applied to the second clock, the number of transferred time-stamped packets in an interval required for selection as a consecutive interval may be increased. In another illustrative embodiment, when a correction factor is applied to the second clock, the defined acceptance window for differences in delay noise may be decreased. When a plurality of consecutive intervals is not selected within a defined time period, the defined acceptance window for differences in delay noise may be increased.

In an additional embodiment, the difference in delay noise comprises is a difference between a percent change of transmit and receive intervals of each of the consecutive intervals. Additionally, a correction factor may be filtered out when the correction factor is not within a correction factor acceptance window.

Advantageously, the present invention in the illustrative embodiments provides a fast unidirectional time synchronization methodology, which tolerates PDV at high orders of magnitude. The present invention further provides orders of magnitude better frequency synchronization.

These and other features and advantages of the present invention will become apparent from the following detailed description of illustrative embodiments thereof, which is to be read in connection with the accompanying drawings.

DETAILED DESCRIPTION

As will be described in detail below, the present invention in the illustrative embodiment relates generally to the field of packet transfer networks and, more particularly, to improved techniques for the transmission of precision timing information from a first clock source to a second clock source over packet networks having propagation delay. The illustrative embodiment extracts a correction factor from consecutive intervals of time-stamped packets having a difference in delay noise within a defined acceptance window.

Figure 1:
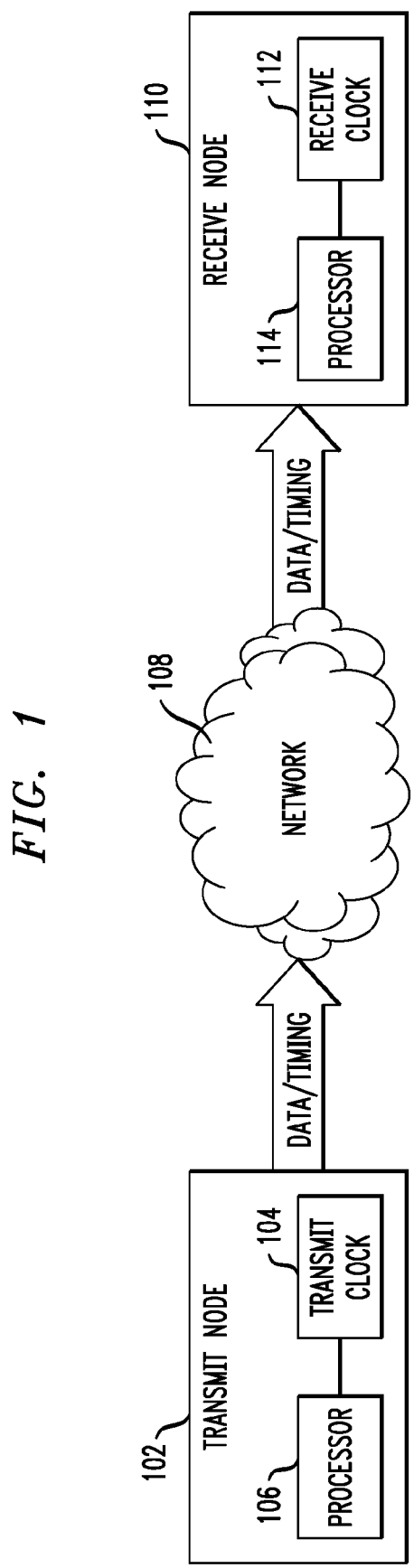
FIG. 1 is a diagram illustrating a packet transfer system, according to an embodiment of the present invention.

Referring initially to FIG. 1, a diagram illustrates a packet transfer system, according to an embodiment of the present invention. A transmit node 102 includes a transmit clock 104, or master clock, in communication with a transmit node processor 106. Packets including data and timing information are transferred through a network 108 to a receive node 110. Receive node 110 includes a receive clock 112, or slave clock, in communication with a receive node processor 114.

An illustrative embodiment of the present invention calculates a local frequency correction factor for application to a current frequency synthesized at receive node 110 when specified conditions are met upon the arrival of time-stamped packets. Timing packets are time-stamped, Sn, by a counter at transmit node 102 at the moment of packet departure in accordance with transmit clock 104, where n is the sequence number of the departure from an arbitrary moment in time marked as $S_0$. At reception, packets are time-stamped, Rn, by a local counter driven by local receive clock 112 that is to be synchronized with the transmit clock 104.

An illustrative embodiment of the present invention further identifies the detection of a condition of packet transfer using only Rn and Sn, which may result from a null PDV of consecutively transferred time-stamped packets, or a linearly increasing propagation delay variation (LPDV). Because there is a higher probability of null PDV occurring, the likelihood of providing the right correction factor is increased. In situations where LPDV is occurring incorrect frequency correction coefficients may be generated. Therefore, LPDV may also be filtered out. The complexity of the post filtering process for LPDV depends on the probability of occurrence of LPDV in packet networks.

Figure 2:
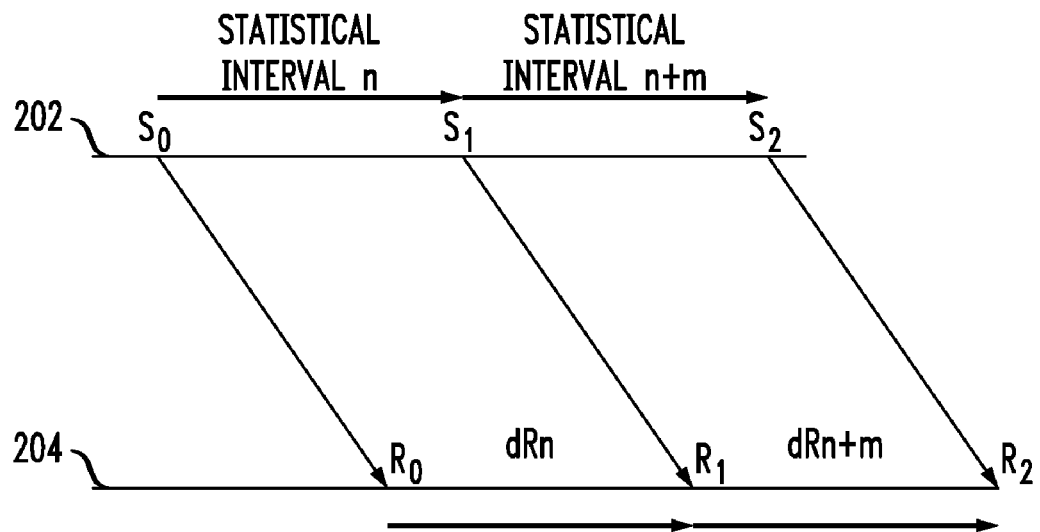
FIG. 2 is a diagram illustrating the transmission of consecutive time-stamped packets without PDV, but with different clock source frequencies, according to an embodiment of the present invention.

Referring now to FIG. 2, a diagram illustrates the transmission of consecutive time-stamped packets without PDV, but with different clock source frequencies, according to an embodiment of the present invention. An initial packet is time-stamped with $S_0$ at a first clock source at a transmit node 202. Upon arriving at a receive node 204, the initial packet is time-stamped with $R_0$ by a second clock source. A subsequent packet in a transfer queue is time-stamped with $S_1$ at transmit node 202, and upon arriving at receive node 204, the packet is time-stamped with $R_1$. The first transmit time difference, $dS_1$, is calculated by subtracting the first transmit time stamp $S_0$ from the second transmit time stamp $S_1$. The first receive time difference, $dR_1$, is calculated by subtracting the first receive time stamp $R_0$ from the second receive time stamp $R_1$. Similar interval calculations are performed for additional packets in the transfer queue, such as, for $S_2$, $R_2$, respectively, to determine a next transmit and receive time difference, $dS_2$, $dR_2$, respectively.

In the illustrative embodiment of FIG. 2, when there is no PDV, the ratio between the differences, dRn/dSn, is the same for all measured intervals ($dR_1/dS_1 = dR_2/dS_2$). This ratio indicates the difference in frequency between the clock sources of the transmit node and the receive node, $fR_0/fS_0$. When the frequencies of the clock sources are identical, the ratio of dRn/dSn is equal to 1. Thus, if there is no PDV the ratio between the differences, dRn/dSn, is a constant that is proportional to the relative difference in frequency.

Figure 3:
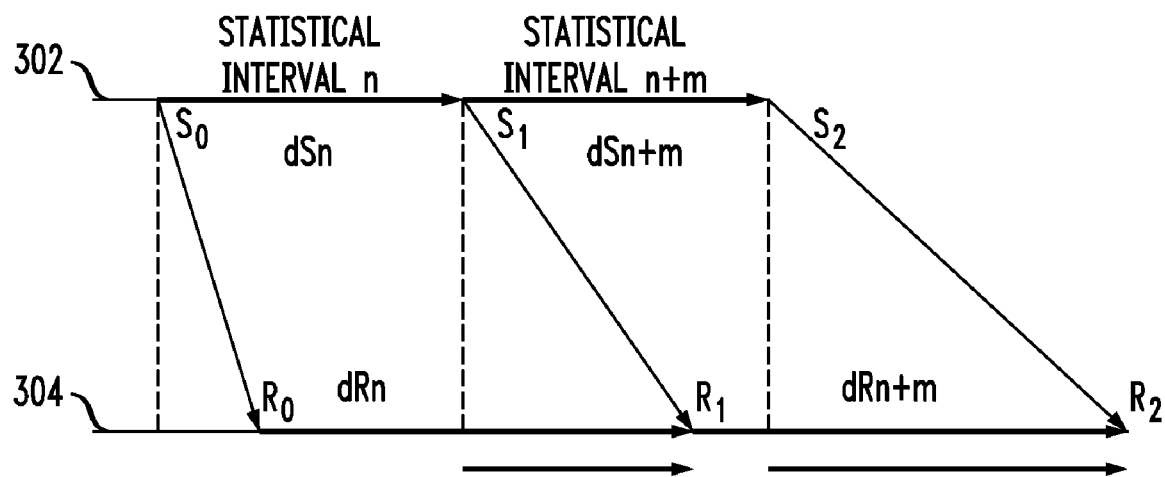
FIG. 3 is a diagram illustrating the transmission of consecutive time-stamped packets with PDV and identical clock source frequencies, according to an embodiment of the present invention.

Referring now to FIG. 3, a diagram illustrates the transmission of consecutive time-stamped packets with PDV and identical clock source frequencies, according to an embodiment of the present invention. FIG. 3 provides a similar illustration to that of FIG. 2; however LPDV is illustrated. An initial packet is time-stamped with $S_0$ from a first clock source at a transmit node 302, and $R_0$ from a second clock source at a receive node 304. As shown, subsequent packets are time-stamped with $S_1$, $R_1$ and $S_2$, $R_2$, respectively. FIG. 3 differs from FIG. 2 in that there is increasing propagation delay, which is shown in the changing of the packet transfer angle from transmit node 302 to receive node 304. PDV may be illustrated where the ratio dRn/dSn fluctuates randomly, or as shown in FIG. 3, the ratio may remain the same for consecutive intervals, however, it is a constant that is not proportional to the relative difference in frequency. Because the frequencies are equal in the illustrative embodiment of FIG. 3, the relative difference in frequency is 1; however the ratio is greater than 1 as a result of LPDV. Such a condition may degrade frequency synchronization through the introduction of a false correction.

Figure 4:
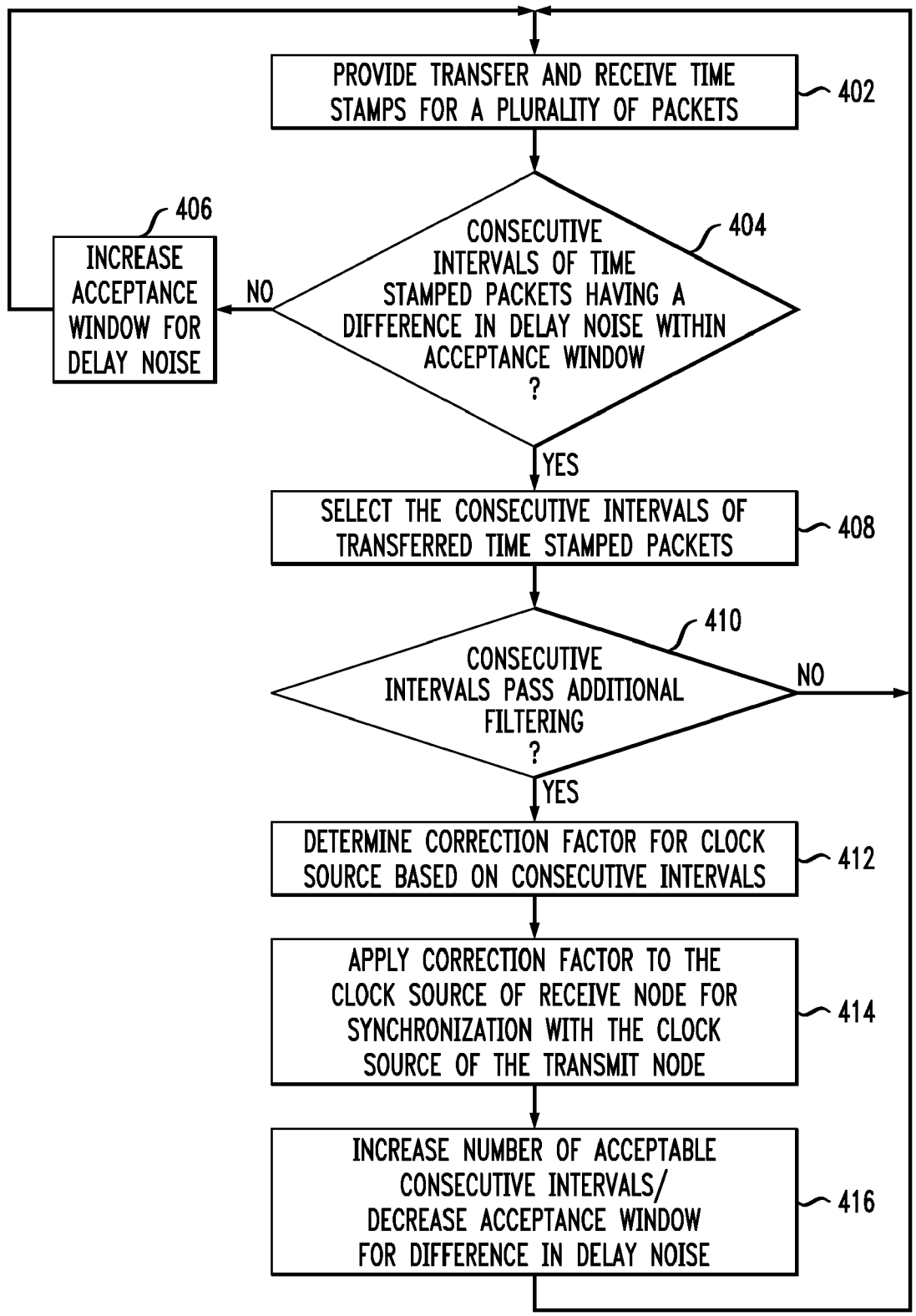
FIG. 4 is a flow diagram illustrating a clock synchronization methodology in a packet network, according to an embodiment of the present invention.

Referring now to FIG. 4, a flow diagram illustrates a clock synchronization methodology in a packet network, according to an embodiment of the present invention. The methodology begins in block 402 where transmit and receive time stamps are continuously provided for a plurality of packets in a transfer queue. The transmit time stamps are provided at the transmit node in accordance with a transmit clock, and the receive time stamps are provided at the receive node in accordance with a receive clock. In block 404, it is determined if consecutive intervals of transferred time-stamped packets can be found that have a difference in delay noise within a defined acceptance window. More specifically, this difference may be defined as a difference in percent change between transmit and receive intervals of each of the consecutive intervals and, referring to the consecutive intervals illustrated FIGS. 2 and 3, $|((dR_2 - dS_2)/dS_2) - ((dR_1 - dS_1)/dS_1)|$. The acceptance window allows for a tolerated error in numerical calculations due to some floor of PDV that is completely random and cannot be reduced to null. It also allows for time stamping inaccuracy at both transmit and receive nodes and other random delay noise encountered in the network. This acceptance window parameter is specific to each network and the equipment used, and can be determined through experimental statistical measurements.

Ideally, statistical intervals are bound by packets with the same propagation delay, thereby having no PDV. The intervals need to be consecutive to be able to avoid accumulation of propagation delay in between the statistical intervals in the pair. This would be equivalent to a phase accumulation inside the network, corrupting the measurement. In block 406, the acceptance window is increased when it is determined that consecutive intervals of transferred time-stamped packets cannot be found within a specified time period. This indicates that the difference in delay noise was higher than the level accepted by the acceptance window value. The methodology then returns to block 402 for determination of additional intervals of transferred time-stamped packets.

If it is determined that consecutive intervals of transferred time-stamped packets can be found, the consecutive intervals having a difference in delay noise within the defined acceptance window are selected in block 408. It is determined in block 410 if the consecutive intervals pass additional filtering criteria. If the consecutive intervals do not pass the additional filtering criteria, the methodology returns to block 402. In block 412, a correction factor, $C_n$, for the clock source of the receive node is determined based on transmit and receive time stamps of the bounding transferred time-stamped packets of the consecutive intervals. In block 414, the correction factor is applied to the clock source of the receive node for synchronization with the clock source of the transmit node. In block 416, the number of required transferred time-stamped packets for selection of an interval may be increased, the acceptance window for difference in delay noise may be decreased, or both, before the methodology returns to block 402 to repeat and maintain timing synchronization. By increasing the number of transferred timestamped packets considered for the interval after every hit, it will take longer to get hits but the accuracy will improve leading to a tighter lock. By decreasing the acceptance window, a lower error margin is considered for the difference in delay noise between consecutive intervals.

One problem faced in an embodiment of the present invention is that it may not be known if the result of having a constant ratio dRn/dSn in consecutive intervals is due to LPDV, as shown in FIG. 3, or no PDV but a difference in the frequencies of the clock sources of the transmit and receive nodes, as shown in FIG. 2. For example, an increase of 2 units may be observed due to a difference in frequency and a high LPDV. While the difference in frequency may require a decrease of 2 units for the counter, the observed increase would result in a correction made that is an increase of 2 units for the counter. Thus, the presence of LPDV would result in a worsening of frequency difference to 4 units. The error was actually increased to double the difference in frequency. It is assumed that because statistically it is less likely to have LPDV than to have PDV=0, wrong frequency correction errors would be rare. Alternatively, a low pass filter or frequency synthesizer allows wrong corrections to be mitigated by the majority of good corrections.

There is also a need to limit the amount of correction once consecutive intervals have been selected and correction factor have been applied. Since such corrections should bring frequencies closer together it is expected that additional corrections to the frequency are smaller. Therefore, if Cn is outside a specified correction acceptance window interval it is an indication that an LPDV situation has been encountered and the correction may be discarded. In this filtering condition, an initial value should be provided that is larger than a maximum expected shift in frequencies.

Described below is a statistical algorithm in which the following variable symbols are utilized:

Sn=source time stamp for packet n
Rn=arrival time stamp for packet n
dSn=Sn−Sn−m=Master counter increment for the Statistical interval n (first Sn differential)
dRn=Rn−Rn−m=Slave counter increment for the Statistical interval n
fRn=the frequency value to be written
m=number of consequent samples considered for the statistical window (can dynamically be adjusted). Initial Value=1.
Cn=fCn=dSn/dRn=Frequency correction coefficient deducted from sample n
Pn=local change factor=(dRn−dSn)/dSn
RPn=(reverse proportion)=(dRn−dSn)/dRn
HSF=Acceptance window shrink factor after a hit (frequency correction). Initial value=100 ppm=10 exp −4; Needs to be an initial parameter when starting the program
RF=recovery factor=increase of acceptance window size with time in between hits. Initial value=10 exp −10. Needs to be an initial parameter when starting the program
Hit=frequency correction event based on this algorithm.
FCAW=Acceptance Window if Cn is within such interval a hit is found and frequency correction triggered (it is adaptable and can be anywhere between 100 ppm to 4 ppB)
NTAW=Network noise acceptance window.
Hit=indicates if a frequency correction was done ("1"). One bit array.
V=variation of precision=proportionality coefficient=rate to decrement precision if is no hits in certain time. Initial value=D.
VC=variation counter. Initial value=0;
D=circular queue depth. Initial value=128 (put it also as a run time parameter)

The algorithm may be processed in the background for every F samples, such as, for example, one second, or 16 samples. F can fluctuate as it is just function of when CPU is available to do the calculations. It is basically the difference between the last processed sample in the queue, marked as L, and the actual sample, L+F. There will be a circular queue of about 128 locations (D=128). The ISR will place a new Sn and Rn for every new received sample in the queue and update its pointer. Then when CPU is available it will process in background F−L samples. ISR will increment L+F write pointer, main program will increment base read pointer L. They will wrap around at D=128.

1. Start
   a. Initialize all parameters
   b. fRn=DF;
2. For n=L+1 to L+F
   a. Calculate dSn=Sn−Sn−m and dRn=Rn−Rn−m
   b. Calculate Cn=dSn/dRn and Pn=(dRn−dSn)/dSn; RPn=(dRn−dSn)/dRn
3. for n=L+1 to L+F test is Abs (Pn−Pn−m)*1000000000<AW
   a. yes:
      If Abs Cn<FCAW
      Set Hit(n)=1
      FCAW=FCAW/HFC
      NTAW=NTAW/HSF (must saturate at AW>7)
      fRn=fRn−m*(Cn+Cn−m)/2−correct local frequency by (Cn+Cn−m)/2, expectation being fRn stored as a variable
      m=m+1; (saturated at m=64)
      VC=0
      Continue at 4 (make sure all the F values are checked) at n=L+F.
      Else FCAW=FCAW+FCRF
      Continue to b
   b. No
      Hit(n)=0
      NTAW=NTAW+RF
      If VC−V=0 or VC−V>0 then
         1. m=m−1. m cannot get lower than 1 (saturated)
         2. VC=0
      VC=VC++
      Continue at 4 at n=L+F.
4. L=L+F
5. Store in the main file (or send it to another location for storage) all the Sn, Rn, dSn, dRn, Cn, Hit, VC for every processed sample n. We need to review them later.

The present invention may be implemented in the form of one or more integrated circuits or computer programs. For example, a given system node in accordance with the invention may be implemented as one or more integrated circuits comprising at least one processor and at least one memory. Numerous other configurations are possible.

In such an integrated circuit implementation, a plurality of identical die is typically formed in a repeated pattern on a surface of a semiconductor wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

Although illustrative embodiments of the present invention have been described herein with reference to the accompanying drawings, it is to be understood that the invention is not limited to those precise embodiments, and that various changes and modifications may be made by one skilled in the art without departing from the scope or spirit of the invention. It is also possible for the illustrative embodiments of the present invention to be implemented as a software program or any other logical method to process information.

What is claimed is:

1. A method of synchronizing a first clock of a transmit node and a second clock of a receive node in a packet network, comprising the steps of:
   selecting consecutive intervals of time-stamped packets transferred from the transmit node to the receive node, wherein the consecutive intervals are selected so as to have a difference in delay noise within a defined acceptance window;

determining a correction factor for the second clock in accordance with transmit and receive time stamps of transferred time-stamped packets bounding the consecutive intervals;

applying the correction factor to the second clock to synchronize the second clock of the receive node with the first clock of the transmit node; and adjusting at least one of (i) a number of transferred time-stamped packets required in an interval for selection as a consecutive interval and (ii) the defined acceptance window;

wherein the defined acceptance window specifies a range of acceptable values for the difference in delay noise.

2. The method of claim 1, wherein, in the step of selecting consecutive intervals, the defined acceptance window is minimized.

3. The method of claim 1, further comprising the step of repeating the selecting, determining and applying steps for additional consecutive intervals of transferred time-stamped packets.

4. The method of claim 1, wherein the adjusting step comprises increasing the number of transferred time-stamped packets required in an interval for selection as a consecutive interval when a correction factor is applied to the second clock.

5. The method of claim 1, wherein the adjusting step comprises decreasing the defined acceptance window when a correction factor is applied to the second clock.

6. The method of claim 1, wherein the adjusting step comprises increasing the defined acceptance window when consecutive intervals are not selected within a defined time period.

7. The method of claim 1, wherein the step of applying the correction factor to the second clock comprises the step of correcting a frequency of the second clock.

8. The method of claim 1, wherein the step of selecting consecutive intervals comprises the steps of:

providing a transmit time stamp on each of a plurality of packets at the transmit node in accordance with the first clock; and providing a receive time stamp on each of the plurality of packets at the receive node in accordance with the second clock.

9. The method of claim 1, wherein, in the step of selecting consecutive intervals, the difference in delay noise comprises a difference in percent change between transmit and receive intervals of each of the consecutive intervals.

10. The method of claim 1, further comprising the step of filtering out the correction factor when the correction factor is not within a defined correction factor acceptance window.

11. An integrated circuit device in a receive node for synchronizing a first clock of a transmit node and a second clock of the receive node, wherein the integrated circuit device is configured to:
select consecutive intervals of time-stamped packets transferred from the transmit node to the receive node, wherein the consecutive intervals are selected so as to have a difference in delay noise within a defined acceptance window;

determine a correction factor for the second clock in accordance with transmit and receive time stamps of transferred time-stamped packets bounding the consecutive intervals;

apply the correction factor to the second clock to synchronize the second clock of the receive node with the first clock of the transmit node; and adjust at least one of (i) a number of transferred time-stamped packets required in an interval for selection as a consecutive interval and (ii) the defined acceptance window;

wherein the defined acceptance window specifies a range of acceptable values for the difference in delay noise.

12. The integrated circuit device of claim 11, wherein the integrated circuit is further configured to repeat the selecting, determining and applying for additional consecutive intervals of transferred time-stamped packets.

13. The integrated circuit device of claim 11, wherein the adjusting comprises increasing the number of transferred time-stamped packets required in an interval for selection as a consecutive interval when a correction factor is applied to the second clock.

14. The integrated circuit device of claim 11, wherein the adjusting comprises decreasing the defined acceptance window when a correction factor is applied to the second clock.

15. The integrated circuit device of claim 11, wherein the adjusting comprises increasing the defined acceptance window when consecutive intervals are not selected within a defined time period.

16. The integrated circuit device of claim 11, wherein the difference in delay noise comprises a difference in percent change between transmit and receive intervals of each of the consecutive intervals.

17. The integrated circuit device of claim 11, wherein the integrated circuit is further configured to filter out the correction factor when the correction factor is not within a defined correction factor acceptance window.

18. A receive node comprising: a clock generator for generating a first clock; and a processor configured to:

select consecutive intervals of time-stamped packets transferred from a transmit node to the receive node, wherein the consecutive intervals are selected so as to have a difference in delay noise within a defined acceptance window;

determine a correction factor for the first clock in accordance with transmit and receive time stamps of transferred time-stamped packets bounding the consecutive intervals;

apply the correction factor to the first clock to synchronize the first clock of the receive node with a second clock of the transmit node; and adjust at least one of (i) a number of transferred time-stamped packets required in an interval for selection as a consecutive interval and (ii) the defined acceptance window;

wherein the defined acceptance window specifies a range of acceptable values for the difference in delay noise.

19. A transmit node comprising:

a clock generator for generating a first clock; and a processor configured to: provide a transmit time stamp on each of a plurality of packets; and transfer each of the plurality of time-stamped packets to a receive node with one or more sets of consecutive intervals of time-stamped packets having a difference in delay noise within a defined acceptance window, wherein the consecutive intervals are selected to determine a correction factor for a second clock of the receive node in accordance with transmit and receive time stamps of transferred time-stamped packets bounding the consecutive intervals, wherein the correction factor is applied to the second clock to synchronize the second clock of the receive node with the first clock of the transmit node, and wherein the receive node adjusts at least one of (i) a number of transferred time-stamped packets required in an interval for selection as a consecutive interval and (ii) the defined acceptance window;

wherein the defined acceptance window specifies a range of acceptable values for the difference in delay noise.

20. An article of manufacture for synchronizing a first clock of a transmit node and a second clock of a receive node in a packet network, comprising a non-transitory machine readable medium containing one or more programs which when executed implement the steps of:

selecting consecutive intervals of time-stamped packets transferred from the transmit node to the receive node, wherein the consecutive intervals are selected so as to have a difference in delay noise within a defined acceptance window;

determining a correction factor for the second clock in accordance with transmit and receive time stamps of transferred time-stamped packets bounding the consecutive intervals;

applying the correction factor to the second clock to synchronize the second clock of the receive node with the first clock of the transmit node; and adjusting at least one of (i) a number of transferred time-stamped packets required in an interval for selection as a consecutive interval and (ii) the defined acceptance window;

wherein the defined acceptance window specifies a range of acceptable values for the difference in delay noise.

21. A packet transfer system comprising:

a transmit node comprising a first clock generator for generating a first clock; and a receive node comprising a second clock generator for generating a second clock and a processor configured to:

select consecutive intervals of time-stamped packets transferred from the transmit node to the receive node, wherein the consecutive intervals are selected so as to have a difference in delay noise within a defined acceptance window;

determine a correction factor for the second clock in accordance with transmit and receive time stamps of transferred time-stamped packets bounding the consecutive intervals;

apply the correction factor to the second clock to synchronize the second clock of the receive node with the first clock of the transmit node; and adjust at least one of (i) a number of transferred time-stamped packets required in an interval for selection as a consecutive interval and (ii) the defined acceptance window;

wherein the defined acceptance window specifies a range of acceptable values for the difference in delay noise.

* * * * *